(12) United States Patent
Hong et al.

(10) Patent No.: US 7,855,756 B2
(45) Date of Patent: Dec. 21, 2010

(54) STEREOSCOPIC DISPLAY DEVICE USING ELECTRICALLY-DRIVEN LIQUID CRYSTAL LENS

(75) Inventors: Hyung Ki Hong, Seoul (KR); Sung Min Jung, Icheon-si (KR)

(73) Assignee: LG Display Co., Ltd., Seoul (KR)

( * ) Notice: Subject to any disclaimer, the term of this patent is extended or adjusted under 35 U.S.C. 154(b) by 108 days.

(21) Appl. No.: 12/289,609

(22) Filed: Oct. 30, 2008

(65) Prior Publication Data
US 2009/0190048 A1    Jul. 30, 2009

(30) Foreign Application Priority Data
Nov. 2, 2007    (KR) ..................... 10-2007-0111354
Oct. 14, 2008    (KR) ..................... 10-2008-0100718

(51) Int. Cl.
   *G02F 1/1335*    (2006.01)
(52) U.S. Cl. ........................ 349/15; 349/16; 349/200
(58) Field of Classification Search ................ 349/11, 349/13, 15, 16, 193, 200, 17, 18
See application file for complete search history.

(56) References Cited

U.S. PATENT DOCUMENTS

| | | | |
|---|---|---|---|
| 4,781,440 A * | 11/1988 | Toda ........................... | 349/15 |
| 6,831,678 B1 * | 12/2004 | Travis ......................... | 348/46 |
| 6,864,862 B2 * | 3/2005 | Sato et al. ..................... | 345/32 |
| 7,058,252 B2 * | 6/2006 | Woodgate et al. .............. | 385/16 |
| 2004/0240777 A1 * | 12/2004 | Woodgate et al. .............. | 385/16 |
| 2009/0015737 A1 * | 1/2009 | Jung et al. ..................... | 349/15 |
| 2009/0122210 A1 * | 5/2009 | Im .............................. | 349/15 |
| 2009/0190048 A1 * | 7/2009 | Hong et al. ................... | 349/15 |

FOREIGN PATENT DOCUMENTS

CN    1525243 A    9/2004

OTHER PUBLICATIONS

Office Action issued Jan. 8, 2010 in corresponding Chinese Application No. 200810174779.3.

* cited by examiner

*Primary Examiner*—Brian M Healy
(74) *Attorney, Agent, or Firm*—Morgan, Lewis & Bockius LLP

(57) ABSTRACT

A stereoscopic display device using an electrically-driven liquid crystal lens is disclosed. The stereoscopic display device includes a display panel, a light source to emit light, and an electrically-driven liquid crystal lens provided between the display panel and the light source and having a reflective electrode to intercept a part of the light emitted from the light source, the electrically-driven liquid crystal lens enabling a wide viewing angle or narrow viewing angle display according to whether or not voltages are applied thereto.

19 Claims, 12 Drawing Sheets

STEREOSCOPIC DISPLAY DEVICE USING ELECTRICALLY-DRIVEN LIQUID CRYSTAL LENS

This application claims the benefit of the Korean Patent Application No. 2007-0111354, filed on Nov. 2, 2007 and Korean Patent Application No. 2008-0100718, filed on Oct. 14, 2008, which are hereby incorporated by references in their entirety as if fully set forth herein.

BACKGROUND OF THE INVENTION

1. Field of the Invention

The present invention relates to a stereoscopic display device, and more particularly, to a stereoscopic display device using an electrically-driven liquid crystal lens.

2. Discussion of the Related Art

In general, stereoscopic images representing 3-dimensions are realized based on the principle of stereo-vision via the viewer's eyes. It can be said that disparity of the viewer's eyes, i.e. binocular disparity due to the viewer's eyes being spaced apart from each other by about 65 mm is the most important factor in stereoscopic sensitivity. Specifically, the viewer's left and right eyes view different 2-dimensional images, respectively, and if the two images are transmitted to the brain through the retina, the brain fuses the images, giving the impression of a real 3-dimensional image. This ability is conventionally called stereography, and a stereoscopic display device is obtained by applying stereography to a display device.

At present, of methods realizing the above-described stereoscopic display device, an electrically-driven liquid crystal lens has been proposed, in which a liquid crystal layer serves as a lens based on characteristics of liquid crystal molecules.

FIG. 1 is a configuration view illustrating a conventional stereoscopic display device using an electrically-driven liquid crystal lens.

The conventional stereoscopic display device using an electrically-driven liquid crystal lens, as shown in FIG. 1, includes a display panel 30, and an electrically-driven liquid crystal lens 40 attached to one side of the display panel 30.

The display panel 30 may be selected from all kinds of displays adapted to display 2-dimensional images. The electrically-driven liquid crystal lens 40 includes two electrodes opposite each other with a liquid crystal layer interposed therebetween. Here, note that liquid crystal molecules constituting the liquid crystal layer have a phase distribution similar to that of an actual lens that controls pathways of incident light in response to the intensity and distribution of an electric field.

As a result, if first and second images IM1 and IM2 are emitted from the display panel 30, the images IM1 and IM2 reach the viewer's left and right eyes via operation of the electrically-driven liquid crystal lens 40 that controls pathways of incident light. Specifically, as shown in FIG. 1, the viewer's right eye views the first image IM1 via light having passed through first image pixels P1 of the display panel 30, and the viewer's left eye views the second image IM2 via light having passed through second image pixels P2 of the display panel 30. As the viewer's right and left eyes view the first and second images IM1 and IM2 corresponding to the different pixels, respectively, the viewer can perceive stereoscopic images.

Recently, to satisfy various consumer desires, there is a need for development of a novel stereoscopic display device capable of facilitating inter-conversion between 3-dimensional images and 2-dimensional images while enabling switching between a wide viewing angle and a narrow viewing angle.

SUMMARY OF THE INVENTION

Accordingly, the present invention is directed to a stereoscopic display device using an electrically-driven liquid crystal lens that substantially obviates one or more problems due to limitations and disadvantages of the related art.

An object of the present invention is to provide a stereoscopic display device using an electrically-driven liquid crystal lens, which can facilitate inter-conversion between 3-dimensional images and 2-dimensional images while enabling switching between a wide viewing angle and a narrow viewing angle.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a stereoscopic display device using an electrically-driven liquid crystal lens comprises: a display panel; a light source to emit light; and the electrically-driven liquid crystal lens provided between the display panel and the light source and containing a reflective electrode to intercept a part of the light emitted from the light source, the electrically-driven liquid crystal lens enabling a wide viewing angle or narrow viewing angle display according to whether or not voltages are applied to the electrically-driven liquid crystal lens. The reflective electrode of the electrically-driven liquid crystal lens may function as a parallax barrier when no voltage is applied to the electrically-driven liquid crystal lens. The electrically-driven liquid crystal lens may function as a diffusing plate when voltages are applied to the electrically-driven liquid crystal lens. The electrically-driven liquid crystal lens may function as a diffusing plate corresponding to a wide viewing angle or narrow viewing angle by adjusting the voltages applied to the electrically-driven liquid crystal lens.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to an electrically-driven liquid crystal lens and a stereoscopic display device using the same according to the preferred embodiments of the present invention, examples of which are illustrated in the accompanying drawings. Wherever possible, the same reference numbers will be used throughout the drawings to refer to the same or like parts.

Figure 1:
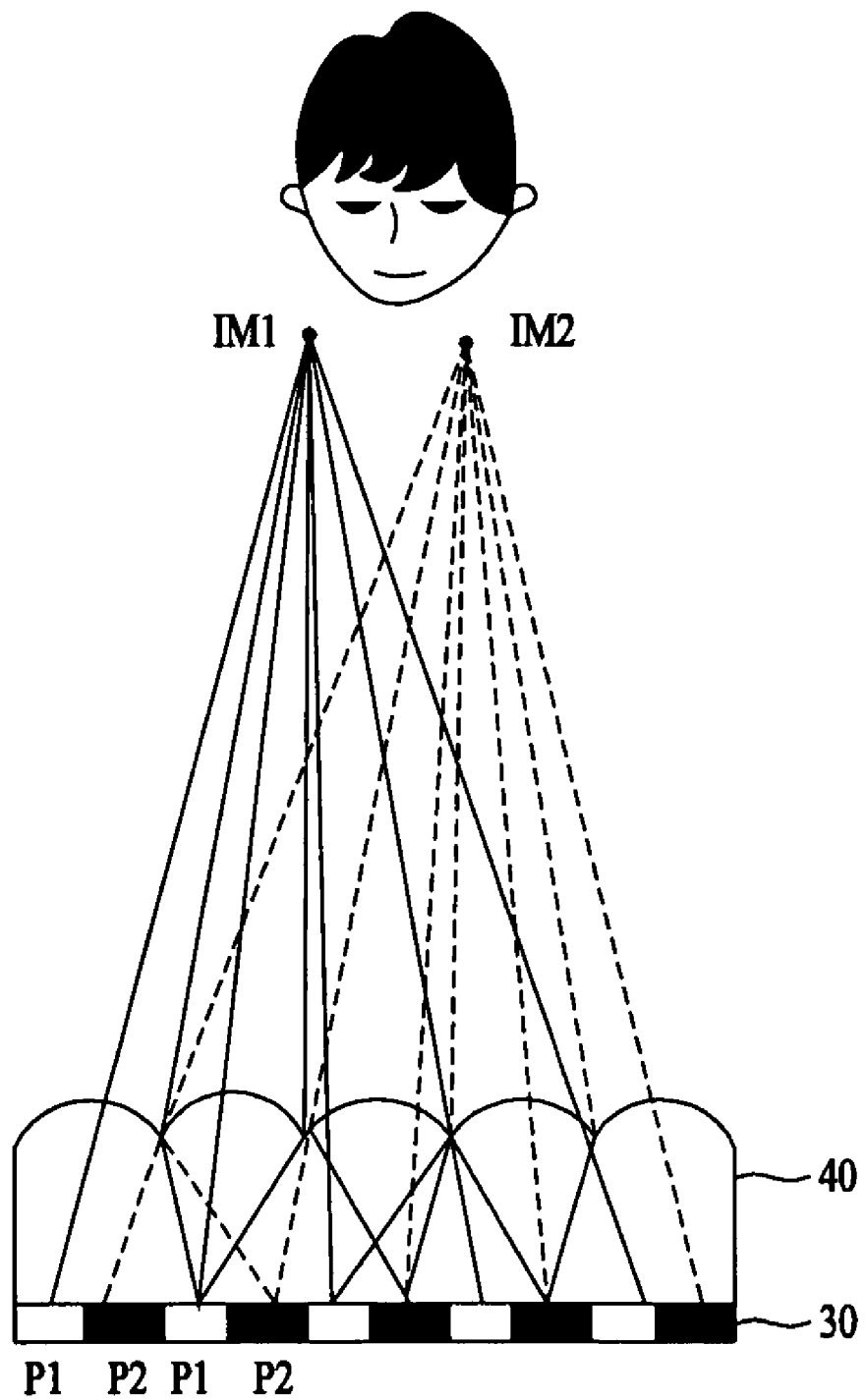
FIG. 1 is a configuration view illustrating a conventional stereoscopic display device using an electrically-driven liquid crystal lens.
Figure 2:
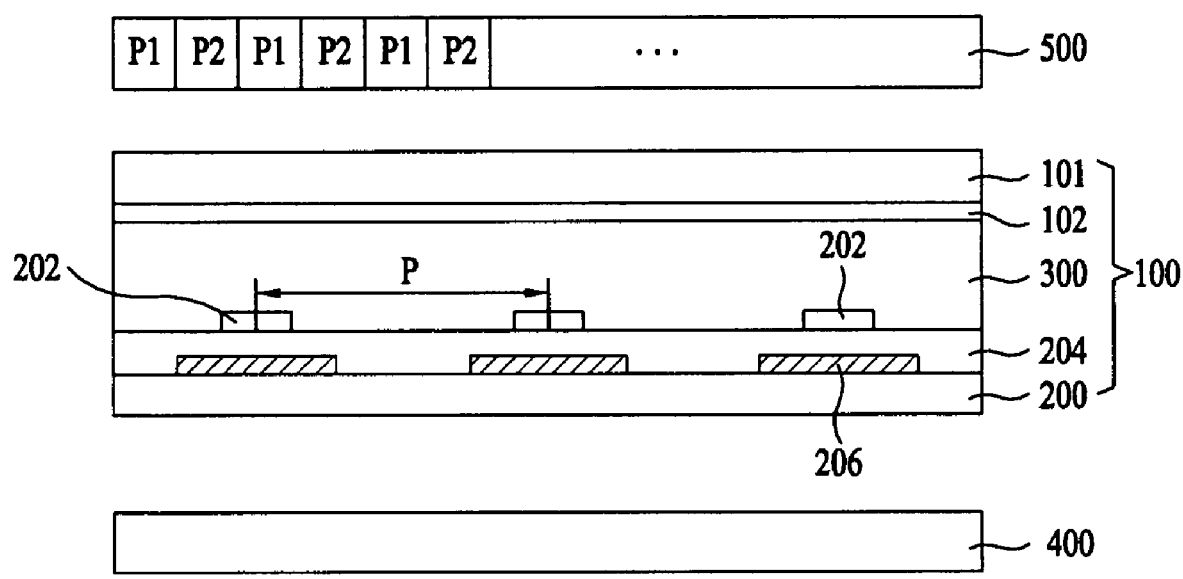
FIG. 2 is a sectional view schematically illustrating a stereoscopic display device using an electrically-driven liquid crystal lens according to a first embodiment of the present invention.

FIG. 2 is a sectional view schematically illustrating a stereoscopic display device using an electrically-driven liquid crystal lens according to a first embodiment of the present invention.

The stereoscopic display device using an electrically-driven liquid crystal lens according to a first embodiment of the present invention, as shown in FIG. 2, includes a display panel 500 serving to emit 2-dimensional images, an electrically-driven liquid crystal lens 100 attached to a lower side of the display panel 500 and serving to provide the 2-dimensional images with optical discrimination directivity, and a light source 400 disposed below the electrically-driven liquid crystal lens 100 and serving to emit light toward the display panel 500.

The display panel 500 contains first and second image pixels P1 and P2 alternately and repeatedly arranged to display first and second images IM1 and IM2, respectively. The display panel 500 can be selected from various flat-panel displays including a Liquid Crystal Display (LCD), Organic Light Emitting Display (OLED), Plasma Display Panel (PDP), Field Emission Display (FED), etc. Although not shown, additionally, upper and lower polarizers are provided at upper and lower sides of the display panel 500.

The electrically-driven liquid crystal lens 100 includes first and second substrates 101 and 200 opposite each other, and a liquid crystal layer 300 between the first and second substrates 101 and 200.

The first substrate 101 is formed, throughout a surface thereof, with a first electrode 102 in the form of a transparent metal film.

The second substrate 200 is sequentially formed thereon with second electrodes 202, an insulating film 204, and third electrodes 206 made of reflective metal. The second electrodes 202 and the third electrodes 206 made of reflective metal are formed, respectively, on the second substrate 200 and the insulating film 204 to a plurality of electrode patterns with a predetermined interval. Specifically, the second electrodes 202 are formed to transparent electrode patterns, and the third electrodes 206 made of reflective metal are formed to opaque electrode patterns using a high-reflectivity metal film such as an aluminum film.

With relation to the neighboring second electrodes 202, a distance from the center of one second electrode 202 to the center of the other second electrode 202 is called a pitch. The same pattern (of the second electrodes) is repeated at intervals of the pitch.

Hereinafter, operation of the electrically-driven liquid crystal lens 100 upon voltage application will be described.

The third electrodes 206 are made of reflective metal to intercept a part of light from the light source 400. The third electrodes 206 may be positioned such that the center of each third electrode 206 is consistent with the center of each second electrode 202, or may be positioned such that each electrode 206 corresponds to a space between the neighboring second electrodes 202.

The first electrode 102 is adapted to receive a voltage different from a voltage applied to the second electrodes 202. Specifically, a higher voltage than that applied to the first electrode 102 is applied to the second electrodes 202. With this voltage condition, the strongest vertical electric field is created at the center of the second electrode 202 and the intensity of the vertical electric field decreases with increasing distance from the second electrode 202. As a result, assuming that liquid crystal molecules constituting the liquid crystal layer 300 have positive dielectric constant anisotropy, the liquid crystal molecules will be aligned in correspondence to the electric field and therefore, are upright at the center of the second electrode 202 and are gradually tilted horizontally away from the second electrode 202. From the viewpoint of light transmission, accordingly, the center of the second electrode 202 has the shortest optical pathway, and the optical pathway increases away from the second electrode 202. Also, from the viewpoint of a phase plane, it can be appreciated that the resulting electrically-driven liquid crystal lens 100 has light transmission effects similar to a parabolic lens having a parabolic lens plane. In conclusion, the electrically-driven liquid crystal lens 100 may function as a simple transparent layer depending on a voltage On/Off state, or may function as parabolic lenses repeated by the same interval of the pitch.

Meanwhile, the third electrodes 206 may be floating electrodes, or voltage may be applied to the third electrodes 206. Assuming that a voltage is applied to the third electrodes 206, the voltage is higher than a voltage applied to the first electrode 102, but is lower than a voltage applied to the second electrodes 202. With this voltage application, the electrically-driven liquid crystal lens 100 can achieve a lens phase plane closer to a parabolic lens plane.

It is noted that, according to whether or not voltages are applied to the first and second electrodes 102 and 202 provided therein, the electrically-driven liquid crystal lens 100 can function as a lens.

In addition, when no voltage is applied to the electrically-driven liquid crystal lens 100, the third electrodes 206 made of reflective metal function as a parallax barrier and can display 3-dimensional images from 2-dimensional images of the display panel 500. When a voltage is applied to the electrically-driven liquid crystal lens 100, lens effects are created between the first electrode 102 and the second electrodes 202, causing light having passed through spaces between the third electrodes 206 to be dispersed against a lens plane and enabling display of 2-dimensional images.

Upon display of 2-dimensional images, a lens curvature is changed according to the magnitude of the voltage applied to the electrically-driven liquid crystal lens 100. For example, a gentle lens curvature causes light directed from the lower side to be widely dispersed, realizing a wide viewing angle, whereas a steep lens curvature causes light having passed through spaces between the third electrodes 206 to be emitted within a reduced range, realizing a narrow viewing angle. Accordingly, upon display of 2-dimensional images, the third electrodes 206 do not exhibit a parallax function and a lens curvature is changed according to a difference between the voltages applied to the first and second electrodes 102 and 202, whereby a wide viewing angle image or narrow viewing angle image can be displayed.

Now, operation of the stereoscopic display device using the electrically-driven liquid crystal lens according to different embodiments of the present invention will be described with reference to the following schematic sectional views.

Figure 3A:
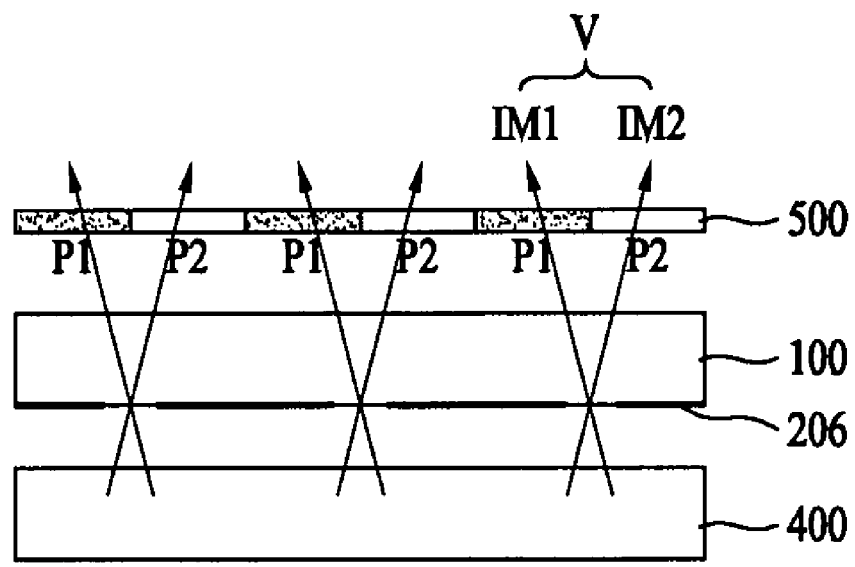
FIGS. 3A and 3B are, respectively, a schematic sectional view explaining a 3-dimensional imaging mode operation realizing a wide viewing angle according to the first embodiment of the present invention and a graph illustrating a relationship between viewing angle and brightness.
Figure 4A:
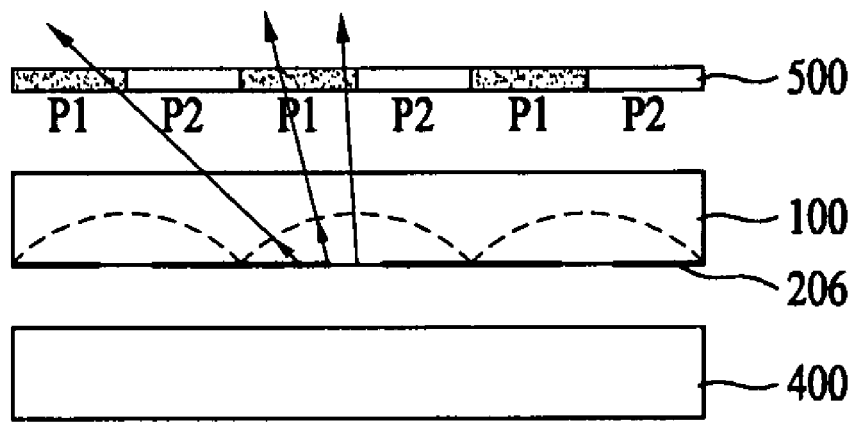
FIGS. 4A and 4B are, respectively, a schematic sectional view explaining a 2-dimensional imaging mode operation realizing a wide viewing angle according to the first embodiment of the present invention and a graph illustrating a relationship between viewing angle and brightness.
Figure 5A:
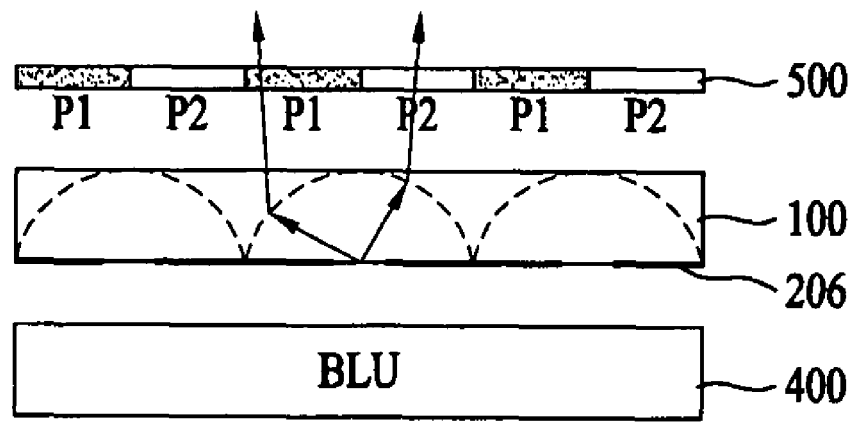
FIGS. 5A and 5B are, respectively, a schematic sectional view explaining a 2-dimensional imaging mode operation realizing a narrow viewing angle according to the first embodiment of the present invention and a graph illustrating a relationship between viewing angle and brightness.
Figure 6A:
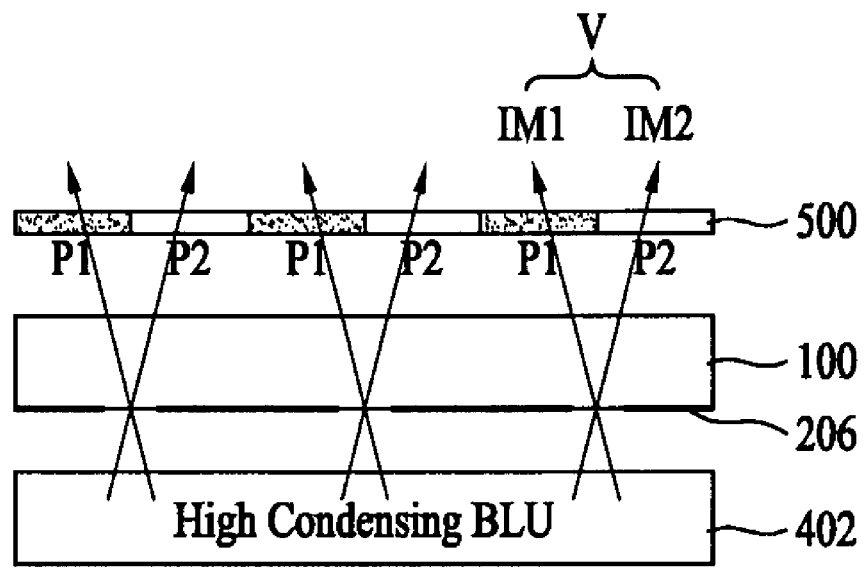
FIGS. 6A and 6B are, respectively, a schematic sectional view explaining a 3-dimensional imaging mode operation realizing a narrow viewing angle of a stereoscopic display device using an electrically-driven liquid crystal lens according to a second embodiment of the present invention and a graph illustrating a relationship between viewing angle and brightness.
Figure 7A:
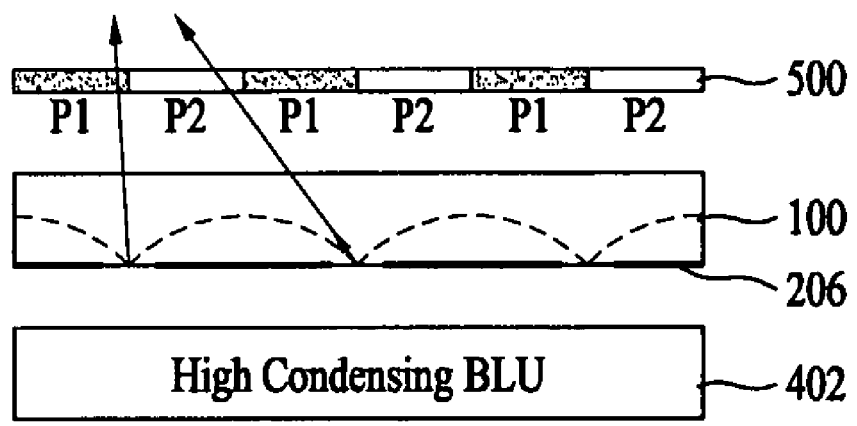
FIGS. 7A and 7B are, respectively, a schematic sectional view explaining a 2-dimensional imaging mode operation realizing a narrow viewing angle of the stereoscopic display device using the electrically-driven liquid crystal lens according to the second embodiment of the present invention and a graph illustrating a relationship between viewing angle and brightness.
Figure 8A:
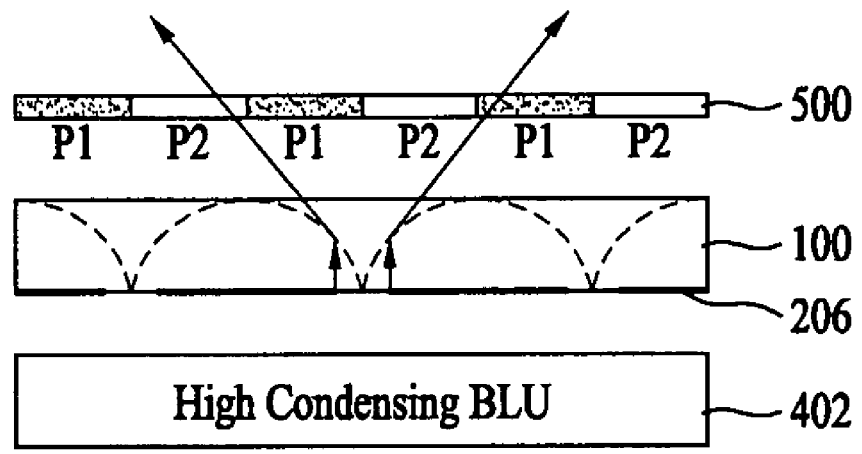
FIGS. 8A and 8B are, respectively, a schematic sectional view explaining a 2-dimensional imaging mode operation realizing a wide viewing angle of the stereoscopic display device using the electrically-driven liquid crystal lens according to the second embodiment of the present invention and a graph illustrating a relationship between viewing angle and brightness.

FIGS. 3A, 4A and 5A are schematic sectional views explaining operation of the stereoscopic display device using the electrically-driven liquid crystal lens having the configuration of FIG. 2 according to the first embodiment of the present invention, wherein the center of the third electrode 206 is located at the center of the second electrode 202, i.e. at the boundary of a lens phase plane. FIGS. 6A, 7A and 8A are schematic sectional views explaining operation of the stereoscopic display device using the electrically-driven liquid crystal lens having the configuration of FIG. 2 according to a second embodiment of the present invention, wherein the center of the third electrode 206 is located between the neighboring second electrodes 202, i.e. at the center of a lens phase plane.

First, the first embodiment of the present invention will be described, wherein the center of the third electrode 206 is located at the center of the second electrode 202, i.e. at the boundary of a lens phase plane.

FIG. 3A is a schematic sectional view illustrating a 3-dimensional imaging mode operation realizing a wide viewing angle, wherein no voltage is applied to the first and second electrodes 102 and 202 of the electrically-driven liquid crystal lens 100. Specifically, a lens phase plane is not produced because no voltage is applied to the first and second electrodes 102 and 202, and the third electrodes 206 intercept a part of light emitted from the light source 400.

When no lens phase plane is produced, light emitted from the light source 400 passes through a transparent liquid crystal layer only at a region not formed with the third electrodes 206 because the third electrodes 206 are made of reflective metal. In this case, the third electrodes 206 function as a parallax barrier, to allow the light to be directed to the first and second image pixels P1 and P2 of the display panel 500. Thereby, a viewer V views a first image IM1 with the right eye and a second image IM2 with the left eye. As the right and left eyes of the viewer V view the first and second images corresponding to different pixels, respectively, the viewer V perceives 3-dimensional images. That is, regardless of a position of the viewer V, the right and left eyes of the viewer V view the first and second images IM1 and IM2 corresponding to the different pixels, respectively, perceiving 3-dimensional images and realizing a wide viewing angle.

Figure 3B:
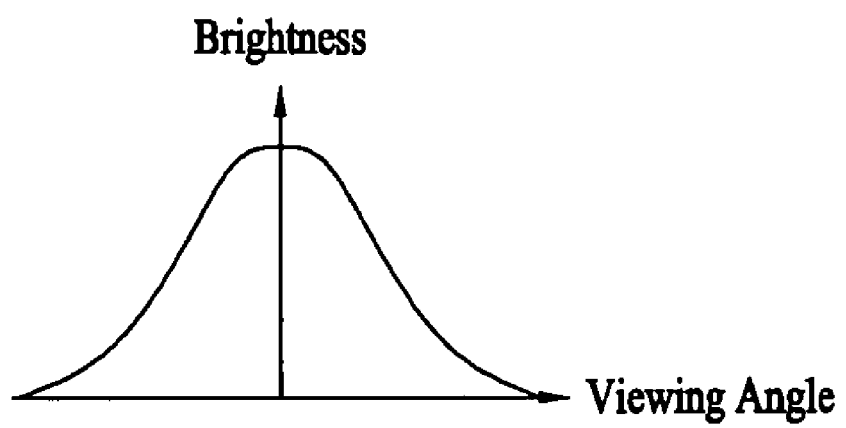

FIG. 3B is a graph illustrating a relationship between viewing angle and brightness in the 3-dimensional imaging mode operation realizing the wide viewing angle. As shown in FIG. 3B, it can be appreciated that the electrically-driven liquid crystal lens has predetermined brightness characteristics in a wide viewing angle range.

FIG. 4A is a view illustrating a 2-dimensional imaging mode operation realizing a wide viewing angle, wherein different voltages are applied to the first electrode 102 (not shown) and the second electrodes 202 of the electrically-driven liquid crystal lens 100, and the center of the third electrode 206 is located at the center of the second electrode 202, i.e. at the boundary of a lens phase plane. Specifically, voltages are applied to the first and second electrodes 102 and 202 to thereby produce a lens phase plane, and the third electrodes 206 intercept a part of light emitted from the light source 400.

When voltages are applied to the first and second electrodes 102 and 202, a gentle lens phase plane can be produced by reducing a voltage difference between the center and the edge of a lens region. In this case, if a focal length is increased to be greater than a fourth of the lens pitch, the third electrodes 206 do not exhibit a parallax function, resulting in a general 2-dimensional imaging mode operation realizing a wide viewing angle.

In this case, the light, having passed through a region not formed with the third electrodes 206, is dispersed via the lens phase plane to thereby be directed to the first and second image pixels P1 and P2 of the display panel 500. As a result, the viewer directly views images through either eye, perceiving 2-dimensional images, regardless of a position of the viewer and a wide viewing angle can be realized. As shown in FIG. 4A, when a focal length is greater than a fourth of the lens pitch of the electrically-driven liquid crystal lens 100, there exists no 3D parallax barrier, resulting in a 2-dimensional imaging mode operation realizing a wide viewing angle. The 2-dimensional imaging mode operation realizing a wide viewing angle is possible as the light, having passed through spaces between the third electrodes 206 made of reflective metal, is uniformly dispersed against a gentle phase plane of the electrically-driven liquid crystal lens 100.

Figure 4B:
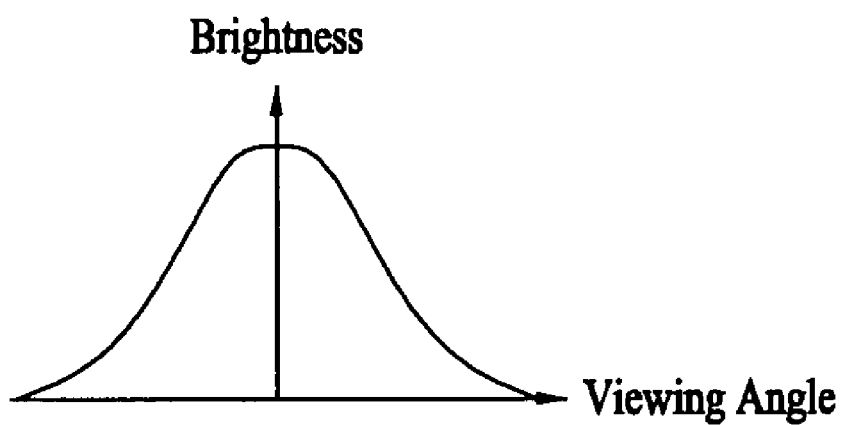

FIG. 4B is a graph illustrating a relationship between viewing angle and brightness in the 2-dimensional imaging mode operation realizing the wide viewing angle. As shown in FIG. 4B, it can be appreciated that the electrically-driven liquid crystal lens has predetermined brightness characteristics in a wide viewing angle range.

FIG. 5A is a view illustrating a 2-dimensional imaging mode operation realizing a narrow viewing angle, wherein different voltages are applied to the first and second electrodes 102 and 202 of the electrically-driven liquid crystal lens 100 and the center and the edge of the lens region have a large voltage difference therebetween to achieve a steep lens curvature close to a semicircle. In this case, light is condensed under the condition of a focal length close to a fourth of the lens pitch, resulting in a 2-dimensional imaging mode operation realizing a narrow viewing angle.

In this case, the light, having passed through a region not formed with the third electrodes 206, is condensed via the lens phase plane to thereby be directed to the first and second image pixels P1 and P2 of the display panel 500. As a result, the viewer directly views images through either eye, perceiving 2-dimensional images within a narrow viewing angle due to the condensing effect of the lens phase plane. In this case, when the viewer views a stereoscopic display device at any location deviated to the left side or right side, transmission of light is intercepted by the condensing effect of the lens phase plane, and a narrow viewing angle can be realized.

Figure 5B:
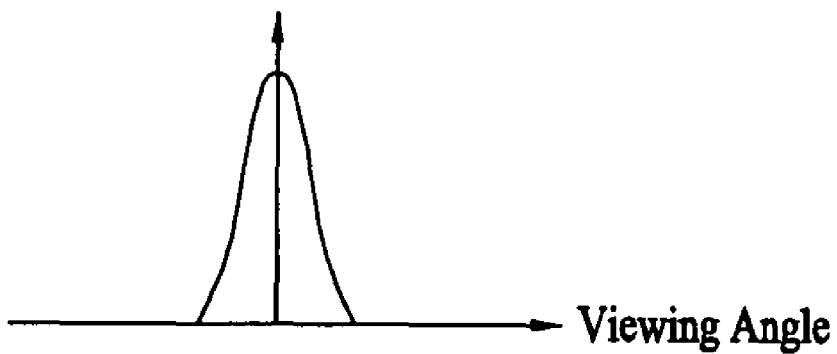

FIG. 5B is a graph illustrating a relationship between viewing angle and brightness in the 2-dimensional imaging mode operation realizing the narrow viewing angle. As shown in FIG. 5B, it can be appreciated that the electrically-driven liquid crystal lens has predetermined brightness characteristics in a narrow viewing angle range.

As described above, note that light directed to the lens phase plane may be dispersed as shown in FIG. 4A, or may be condensed as shown in FIG. 5A, according to a distance from the center of the lens phase plane of the electrically-driven liquid crystal lens to a focal point, i.e. according to a focal length.

Next, a second embodiment of the present invention will be described, wherein the center of the third electrode 206 is located between the neighboring second electrodes 202, i.e. at the center of a lens phase plane.

FIG. 6A is a view illustrating a 3-dimensional imaging mode operation realizing a narrow viewing angle, wherein no voltage is applied to the first and second electrodes 102 and 202 of the electrically-driven liquid crystal lens 100. In this case, a light source 402 may be a high-condensing backlight having a high condensing efficiency of light to be emitted. Specifically, a lens phase plane is not produced because no voltage is applied to the first and second electrodes 102 and 202, and the third electrodes 206 intercept a part of light emitted from the light source 402.

Condensed light from the high-condensing backlight passes through a region not formed with the third electrodes 206, i.e. passes through the electrically-driven liquid crystal lens 100, as a simple transparent layer, to thereby be directed to the first and second image pixels P1 and P2 of the display panel 500. As a result, the viewer V views a first image IM1 with the right eye and a second image IM2 with the left eye. As the right and left eyes of the viewer view the first and second images corresponding to different pixels, respectively, the viewer perceives 3-dimensional images. Meanwhile, at the location of the viewer V, the light is condensed via the high-condensing backlight to thereby be directed to the display panel 500. Accordingly, the first and second images IM1 and IM2 cannot be viewed at any location deviated to the left side or right side, resulting in a 3-dimensional imaging mode operation realizing a narrow viewing angle.

As described above, when no lens phase plane is produced, the light emitted from the high-condensing light source 402 passes through a transparent liquid crystal layer only at a region not formed with the third electrodes 206 because the third electrodes 206 are made of reflective metal. As the third electrodes 206 function as a parallax barrier, the light from the high-condensing light source 402 is emitted only within a predetermined range, resulting in a 3-dimensional imaging mode operation realizing a narrow viewing angle.

Figure 6B:
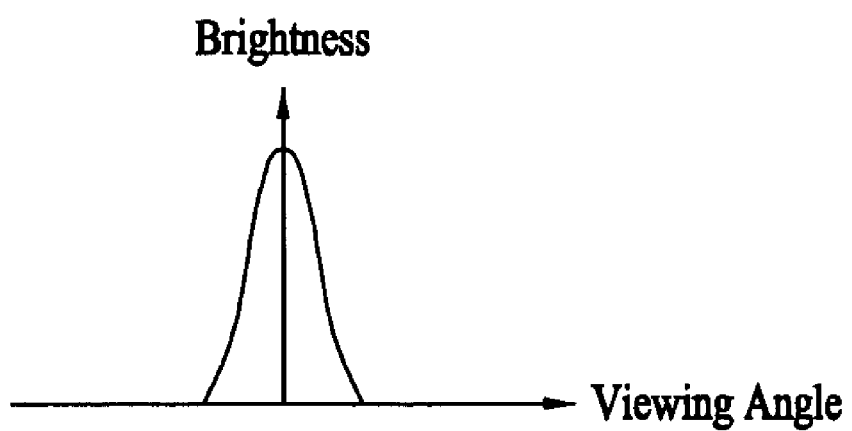

FIG. 6B is a graph illustrating a relationship between viewing angle and brightness in the 3-dimensional imaging mode realizing the wide viewing angle. As shown in FIG. 6B, it can be appreciated that the electrically-driven liquid crystal lens has predetermined brightness characteristics in a narrow viewing angle range.

Next, an electrically-driven liquid crystal lens according to a second embodiment of the present invention is designed such that the boundary of a lens phase plane is located between the neighboring reflective third electrodes 206, in order to prevent the highly condensed light, having passed through spaces between the third electrodes 206, from being widely dispersed along the boundary of a gentle lens phase plane and consequently, to display an image within a predetermined viewing angle range. FIG. 7A is a view illustrating a 2-dimensional imaging mode operation realizing a narrow viewing angle, wherein different voltages are applied to the first and second electrodes 102 and 202 of the electrically-driven liquid crystal lens 100 and the center of the third electrode 206 is located between the neighboring second electrodes 202, i.e. at the center of a lens phase plane. Specifically, voltages are applied to the first and second electrodes 102 and 202 to thereby produce a lens phase plane, and the third electrodes 206 intercept a part of light emitted from the light source 402. When voltages are applied to the first and second electrodes 102 and 202, a gentle lens phase plane can be produced by reducing a voltage difference between the center and the edge of the lens region. In this case, if a focal length is increased to be greater than a fourth of the lens pitch, the third electrodes 206 do not exhibit a parallax function and the light is emitted within a narrow viewing angle range along the gentle lens phase plane between the third electrodes 206, resulting in a general 2-dimensional imaging mode operation realizing a wide viewing angle.

In this case, the light, having passed through a region not formed with the third electrodes 206, is condensed via the boundary of the lens phase plane to thereby be directed to the first and second image pixels P1 and P2 of the display panel 500. As a result, the viewer directly views images through either eye, perceiving 2-dimensional images. Meanwhile, only at a location of the viewer in a predetermined region, the light is condensed via the boundary of the lens phase plane to thereby be directed to the display panel 500. Accordingly, when the viewer is located at the outside of the predetermined region, the images cannot be viewed, and a narrow viewing angle can be realized.

Figure 7B:
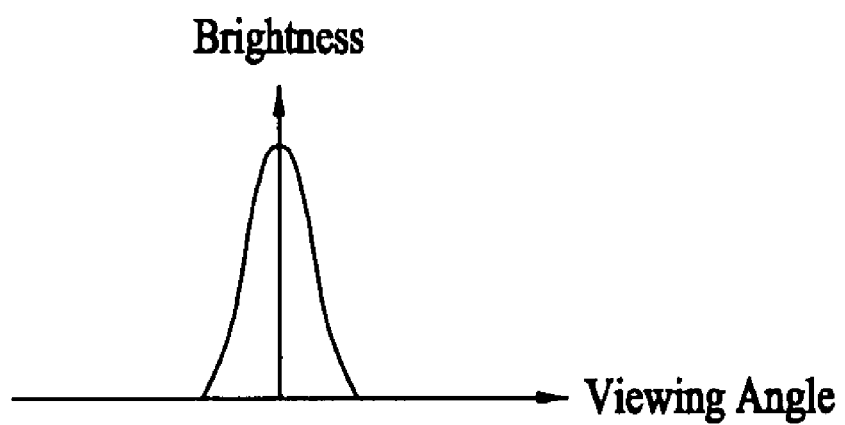

FIG. 7B is a graph illustrating a relationship between viewing angle and brightness in the 2-dimensional imaging mode realizing the narrow viewing angle. As shown in FIG. 7B, it can be appreciated that the electrically-driven liquid crystal lens has predetermined brightness characteristics in a narrow viewing angle range.

FIG. 8A is a view illustrating a 2-dimensional imaging mode operation realizing a wide viewing angle, wherein different voltages are applied to the first and second electrodes 102 and 202 of the electrically-driven liquid crystal lens 100, and the center of the third electrode 206 is located between the neighboring second electrodes 202, i.e. at the center of a lens phase plane. In this case, the center and the edge of the lens region may have a large voltage difference, providing a large lens curvature and consequently, a steep lens phase plane similar to a semicircle. This results in a focal length close to a fourth of the lens pitch, and the condensed light from the high-condensing light source 402, having passed through spaces between the third electrodes 206, is dispersed at the boundary of the steep lens phase plane, resulting in a 2-dimensional imaging mode operation realizing a narrow viewing angle.

In this case, the light, having passed through a region not formed with the third electrodes 206, is dispersed via the boundary of a lens phase plane to thereby be directed to the first and second image pixels P1 and P2 of the display panel 500. As a result, the viewer directly views images through either eye, perceiving 2-dimensional images. In this case, since the emitted light is dispersed, the viewer can perceive images at any location deviated to the left side or right side, and a wide viewing angle can be realized.

Figure 8B:
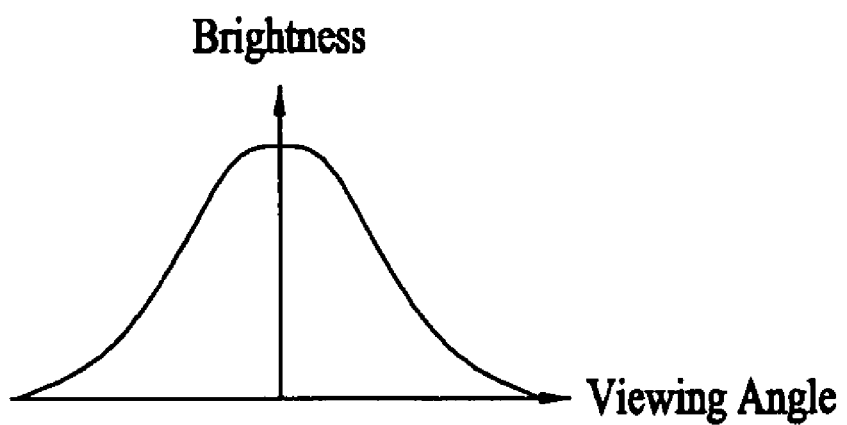

FIG. 8B is a graph illustrating a relationship between viewing angle and brightness in the 2-dimensional imaging mode realizing the wide viewing angle. As shown in FIG. 8B, it can be appreciated that the electrically-driven liquid crystal lens has predetermined brightness characteristics in a wide viewing angle range. In this case, the electrically-driven liquid crystal lens 100 including the third electrodes 206 can function similar to a diffusing plate.

As described above, note that, according to a distance from the center of the phase plane of the electrically-driven liquid crystal lens to a focal point, i.e. according to a focal length, light directed to the boundary of the lens phase plane may be condensed, resulting in a 2-dimensional imaging mode operation realizing a narrow viewing angle as shown in FIG. 7A, or may be dispersed, resulting in a 2-dimensional imaging mode operation realizing a wide viewing angle as shown in FIG. 8A.

Next, a stereoscopic display device according to a third embodiment of the present invention will be described with reference to the following schematic sectional view, which has a different configuration from those of the above-described first and second embodiments.

Figure 9:
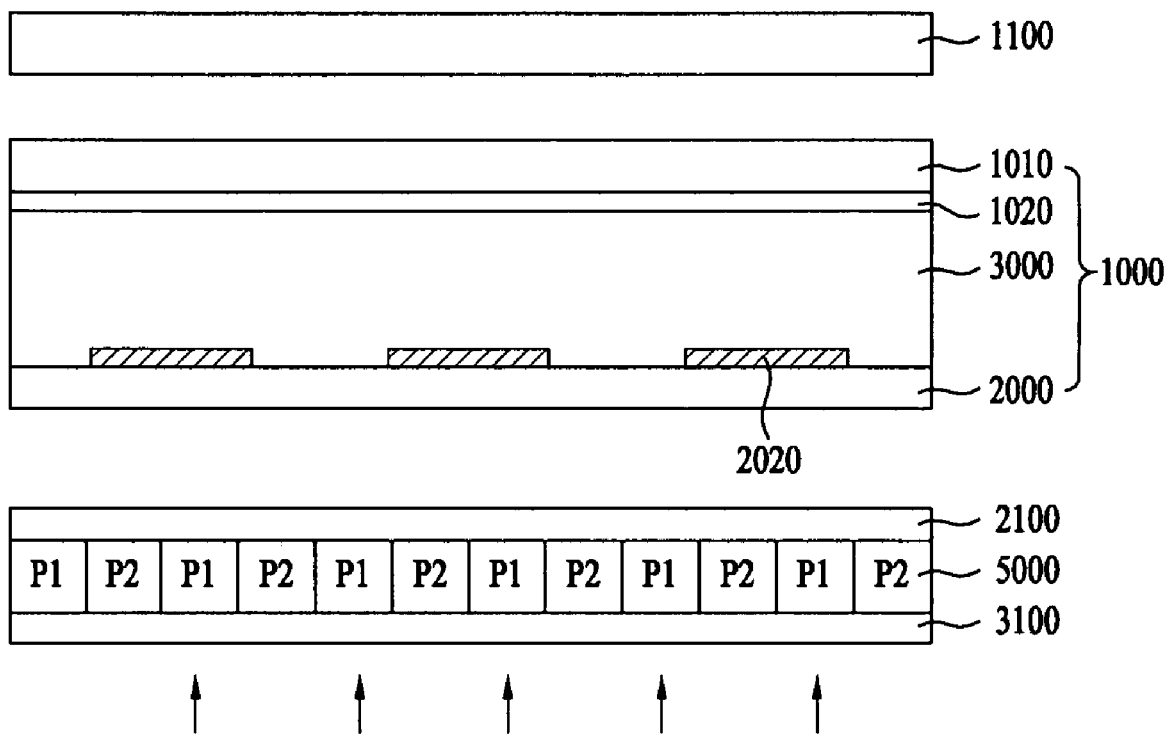
FIG. 9 is a sectional view illustrating a stereoscopic display device using an electrically-driven liquid crystal lens according to a third embodiment of the present invention.

FIG. 9 is a sectional view schematically illustrating a stereoscopic display device using an electrically-driven liquid crystal lens according to a third embodiment of the present invention.

The stereoscopic display device using an electrically-driven liquid crystal lens according to the third embodiment of the present invention, as shown in FIG. 9, includes a display panel 5000 serving to emit 2-dimensional images, an electrically-driven liquid crystal lens 1000 attached to an upper side of the display panel 500 and serving to provide the 2-dimensional images with optical discrimination directivity, a lens polarizer 1100 disposed above the electrically-driven liquid crystal lens 1000, and a light source (not shown) disposed underneath the display panel 5000 and serving to emit light toward the display panel 5000.

The display panel 5000 is identical to the display panel 500 of the above-described first and second embodiments.

Upper and lower polarizers 2100 and 3100 are provided at upper and lower sides of the display panel 5000.

The electrically-driven liquid crystal lens 1000 includes first and second substrates 1010 and 2000 opposite each other, and a liquid crystal layer 3000 formed between the first and second substrates 1010 and 2000.

A first electrode 1020 in the form of a transparent metal film is formed over the entire surface of the first substrate 1010.

A plurality of second electrodes 2020, defining electrode patterns with a predetermined interval, is formed on the second substrate 2000. In the neighboring second electrodes 2020, a distance from the center of one second electrode 2020 to the center of the other second electrode 2020 is called a pitch. The same pattern (of the second electrodes) is repeated at intervals of the pitch.

Now, operation of the electrically-driven liquid crystal lens 1000 upon voltage application will be described.

The first electrode 1020 is adapted to receive a voltage different from a voltage applied to the second electrode 2020. Specifically, a voltage close to a ground voltage is mainly applied to the first electrode 1010, and a slightly higher voltage than that applied to the first electrode 1010 is applied to the second electrode 2020. With this voltage condition, the strongest vertical electric field is created at the center of the second electrode 2020 and the intensity of the vertical electric field decreases with increasing distance from the second electrode 2020. As a result, assuming that liquid crystal molecules constituting the liquid crystal layer 3000 have positive dielectric constant anisotropy, the liquid crystal molecules will be arranged in correspondence to the electric field and therefore, are upright at the center of the second electrode 2020 and are gradually tilted horizontally away from the second electrode 2020. From the viewpoint of light transmission, the center of the second electrode 2020 has the shortest optical pathway, and the optical pathway increases away from the second electrode 2020. Also, from the viewpoint of a phase plane, it can be appreciated that the resulting electrically-driven liquid crystal lens 1000 has light transmission effects similar to an actual lens having a parabolic lens plane. In conclusion, the electrically-driven liquid crystal lens 1000 may function as a simple transparent layer according to a voltage On/Off state, or may function as parabolic lenses repeated by the same interval of the pitch.

A third electrode (not shown) and the like may be further provided on the second substrate 2000, to which a lower voltage than that applied to the second voltage 2020 is applied, so as to make a phase plane of the electrically-driven liquid crystal lens be closer to a parabolic plane.

Liquid crystals of the liquid crystal layer 3000 are aligned in an initial Electrically Controlled Birefringence (ECB) mode as first and second alignment layers (not shown) formed at inner surfaces of the first and second substrates 1010 and 2020 are subjected to rubbing in anti-parallel directions.

A transmission axis of the lens polarizer 1100 is consistent with a transmission axis of the upper polarizer 2100, and is perpendicular to a transmission axis of the lower polarizer 3100.

According to whether or not voltages are applied to the first and second electrodes 1020 and 2020 provided therein, the electrically-driven liquid crystal lens 1000 can display 3-dimensional images from 2-dimensional images of the display panel 5000.

When the same voltage is applied to the plurality of second electrodes 2020 formed on the second substrate 2000 and a different voltage is applied to the first electrode 1020 on the first substrate 1010, liquid crystals of the electrically-driven liquid crystal lens 1000 are slightly tilted and are aligned to an ECB mode, thereby allowing the light having passed through the display panel 5000 to be emitted only within a predetermined viewing angle range and resulting in a 2-dimensional imaging mode operation realizing a narrow viewing angle.

Now, operation of the stereoscopic display device using the electrically-driven liquid crystal lens according to the third embodiment of the present invention will be described with reference to the following schematic sectional views.

Figure 10A:
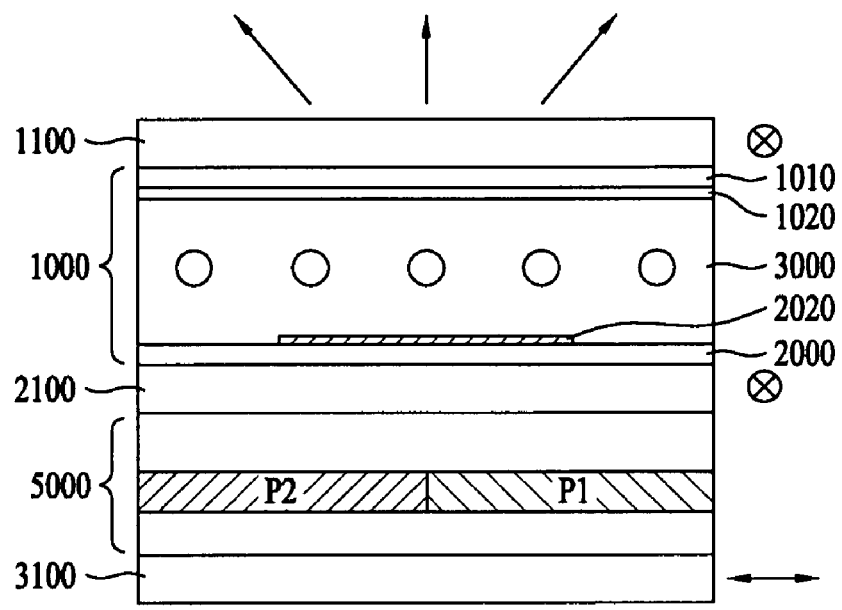
FIG. 10A is schematic sectional view explaining a 2-dimensional imaging mode operation realizing a wide viewing angle of the stereoscopic display device according to the third embodiment of the present invention.
Figure 10B:
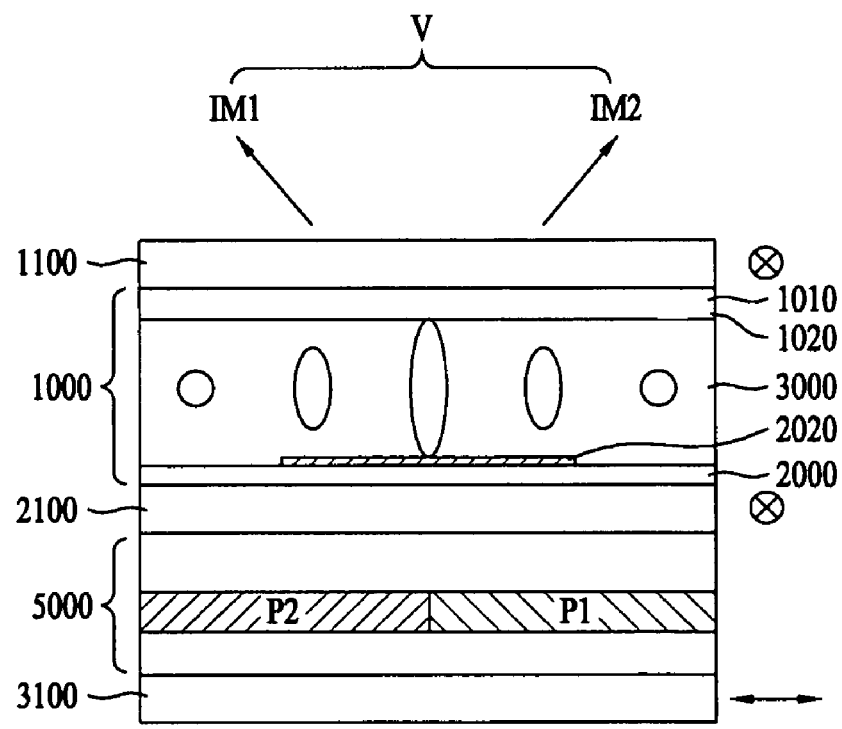
FIG. 10B is a schematic sectional view explaining a 3-dimensional imaging mode operation realizing a wide viewing angle of the stereoscopic display device according to the third embodiment of the present invention.
Figure 10C:
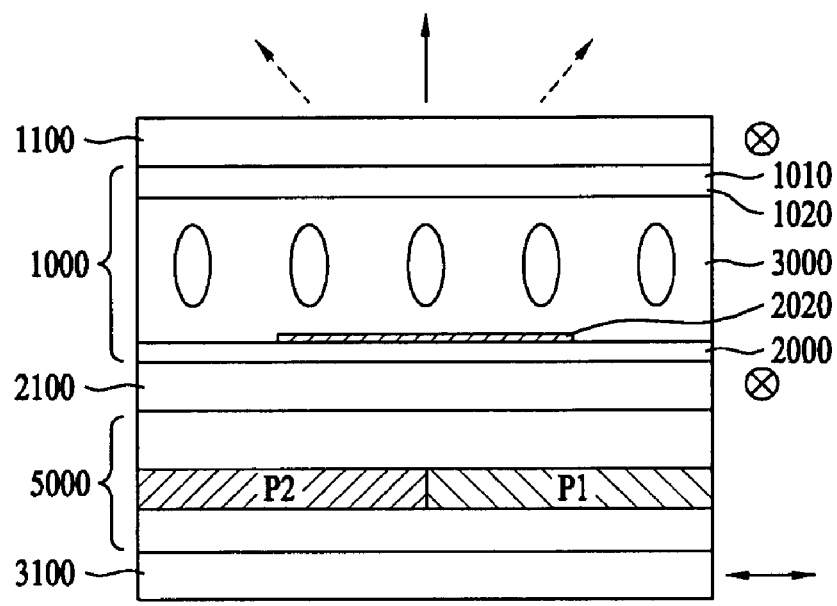
FIG. 10C is a schematic sectional view explaining a 2-dimensional imaging mode operation realizing a narrow viewing angle of the stereoscopic display device according to the third embodiment of the present invention.

FIG. 10A is schematic sectional view explaining a 2-dimensional imaging mode operation realizing a wide viewing angle of the stereoscopic display device according to the third embodiment of the present invention. FIG. 10B is a schematic sectional view explaining a 3-dimensional imaging mode operation realizing a wide viewing angle of the stereoscopic display device according to the third embodiment of the present invention. FIG. 10C is a schematic sectional view explaining a 2-dimensional imaging mode operation realizing a narrow viewing angle of the stereoscopic display device according to the third embodiment of the present invention.

First, FIG. 10A is a schematic sectional view illustrating a 2-dimensional imaging mode, wherein no voltage is applied to the first and second electrodes 1020 and 2020 of the electrically-driven liquid crystal lens 1000. Specifically, a lens phase plane is not produced because no voltage is applied to the first and second electrodes 1020 and 2020.

Light, emitted from the light source (not shown), directly passes the electrically-driven liquid crystal lens 1000 which does not produce lens phase plane because no voltage is applied thereto, to thereby be directed to first and second image pixels P1 and P2 of the display panel 5000. As a result, the viewer directly views images from the display panel 5000 through either eye, perceiving 2-dimensional images. In this case, the viewer can directly view the images through either eye even at any location deviated to the left side or right side, perceiving the same images, and a wide viewing angle can be realized.

FIG. 10B is a view illustrating a 3-dimensional imaging mode realizing a wide viewing angle, wherein different voltages are applied to the first and second electrodes 1020 and 2020 of the electrically-driven liquid crystal lens 1000. Specifically, voltages are applied to the first and second electrodes 1020 and 2020 to thereby produce a lens phase plane.

Light, emitted from the light source (not shown), is dispersed via the lens phase plane produced upon voltage application to thereby be directed to the first and second image pixels P1 and P2 of the display panel 5000. As a result, the viewer can view a first image IM1 with the left eye and a second image IM2 with the right eye. As the left and right eyes of the viewer view the first and second images corresponding to different pixels, respectively, perceiving 3-dimensional images. Upon display of 3-dimensional images, the same image can be perceived regardless of any location deviated to the left side or right side, and a wide viewing angle can be realized.

FIG. 10C is a view illustrating a 2-dimensional imaging mode realizing a narrow viewing angle, wherein different voltages are applied to the first and second electrodes 1020 and 2020 of the electrically-driven liquid crystal lens 1000. In this case, a predetermined voltage is applied to the first electrode 1010, and a zero voltage 0V or floating voltage is applied to the plurality of second electrodes 2020, whereby a predetermined voltage difference between the first electrode 1020 and the second voltages 2020 can be assured and a uniform electric field can be created in the liquid crystal layer to thereby produce no lens phase plane. As compared to FIG. 10A wherein the center and the edge of a lens region have different electric field effects on a per region basis to realize a lens phase plane, in FIG. 10C, the center and the edge of the lens region have the same electric field effect.

Meanwhile, in the following experiments, the voltages were applied to the first and second electrodes 1020 and 2020 to tilt liquid crystals by about 45 degrees.

Since a uniform electric field is created and thus, the electrically-driven liquid crystal lens 1000 does not have a lens phase plane, light emitted from the light source (not shown) recognizes the electrically-driven liquid crystal lens 1000 as a simple transparent layer, but undergoes double refraction because the liquid crystals are aligned by a predetermined tilting angle. Thereby, the light is emitted only in a forward narrow viewing angle and is intercepted in other directions, resulting in a 2-dimensional imaging mode operation realizing a narrow viewing angle. That is, with the alignment of the electrically-driven liquid crystal lens 1000 and the arrangement of the lens polarizer 1100, the light directed to the display panel 5000 transmits images only in a predetermined viewing angle, and images cannot be viewed at any location deviated to the left side or right side, and a narrow viewing angle can be realized.

In other words, if liquid crystals of the electrically-driven liquid crystal lens 1000 are initially aligned in an ECB mode and voltages are applied to the first and second electrodes 1010 and 2020 to cause the same voltage difference regardless of a lens region, liquid crystals are tilted by about 45 degrees. Thereby, the light directed to the display panel has a difference in phase value according to the tilting direction of a viewing angle.

Figure 10D:
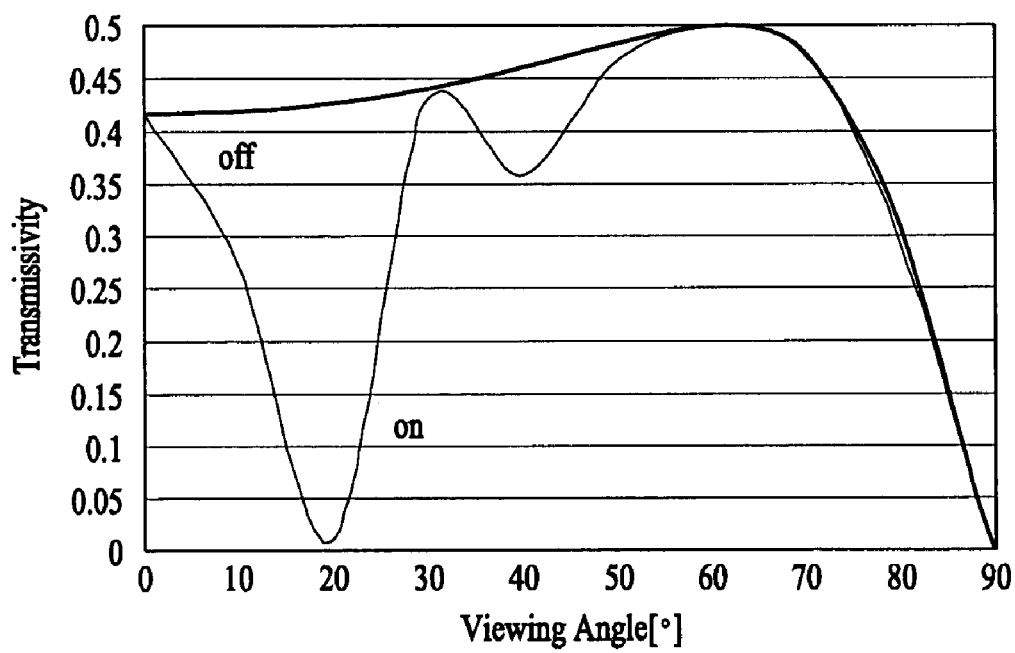
FIG. 10D is a graph illustrating a relationship between transmissivity and viewing angle under wide viewing angle and narrow viewing angle conditions of the stereoscopic display device using the electrically-driven liquid crystal lens according to the third embodiment of the present invention.

FIG. 10D is a graph illustrating a relationship between transmissivity and viewing angle under the wide viewing angle and narrow viewing angle conditions the stereoscopic display device using the electrically-driven liquid crystal lens according to the third embodiment of the present invention.

In this experiment, for a 2-dimensional imaging mode operation realizing a narrow viewing angle, voltage to be applied to the first and second electrodes 1020 and 2020 were set so as to tilt liquid crystals by about 45 degrees.

As shown in FIG. 10D, in a voltage-off state wherein no voltage is applied to the electrically-driven liquid crystal lens 1000, it can be appreciated that the electrically-driven liquid crystal lens 1000 displays 2-dimensional images of a wide viewing angle and has transmissivity of about 0.4 or more at a viewing angle of 70 degrees or less. That is, high-quality display is possible at a viewing angle of 70 degrees or less. Also, in a voltage-on state wherein different voltages having a uniform voltage difference are applied to the first and second electrodes of the electrically-driven liquid crystal lens 1000 to create a uniform electric field, it can be appreciated that the electrically-driven liquid crystal lens 1000 displays 2-dimensional images of a narrow viewing angle with a deteriorated transmissivity in a viewing angle of about 20 degrees.

However, the above description does not contemplate a lower light source and therefore, even upon display of images of a narrow viewing angle, transmissivity can be enhanced if the viewing angle greatly exceeds 20 degrees. The complementary example will not be described.

Figure 11A:
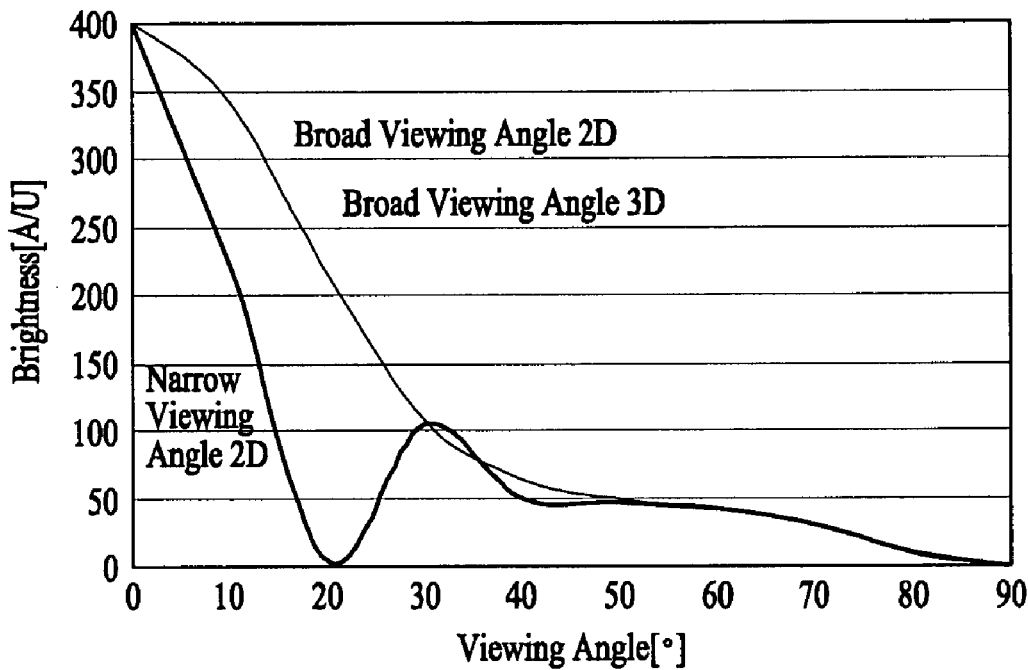
FIGS. 11A and 11B are graphs illustrating a relationship between viewing angle and brightness of the stereoscopic display device before and after brightness adjustment of a backlight unit according to the third embodiment of the present invention.
Figure 11B:
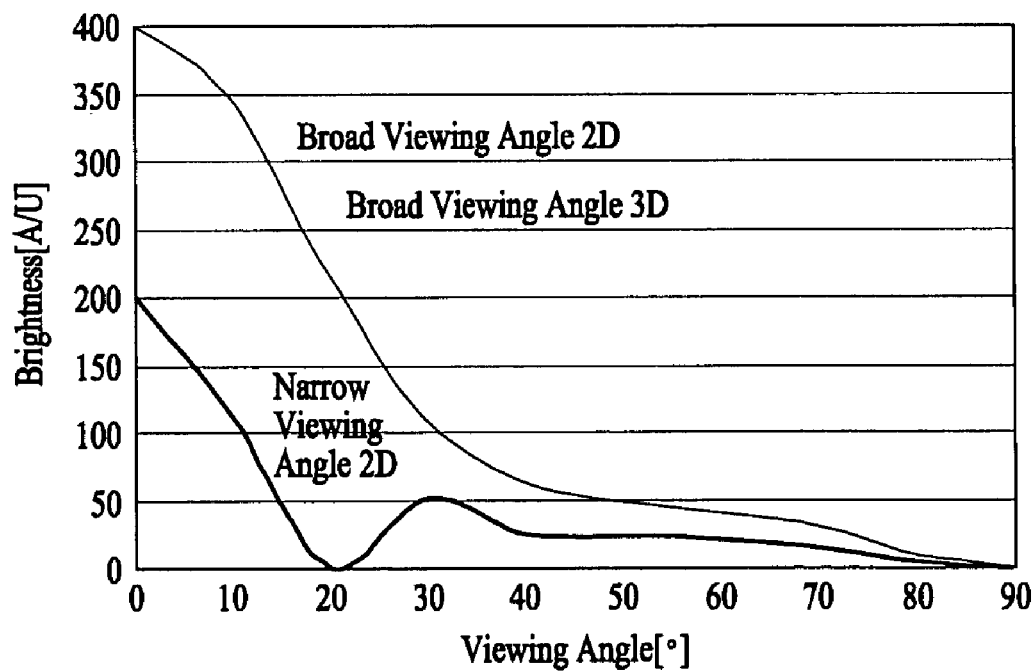

FIGS. 11A and 11B are graphs illustrating a relationship between viewing angle and brightness of the stereoscopic display device before and after brightness adjustment of a backlight unit according to the third embodiment of the present invention.

FIG. 11A illustrates brightness upon display of images in a wide viewing angle using a backlight unit and an additional light source. It can be appreciated that a 2-dimensional imaging mode operation realizing a narrow viewing angle results in a reduced brightness at a viewing angle of about 20 degrees. However, the brightness can be again enhanced at a viewing angle of 20 degrees or more. To compensate for this problem, as shown in FIG. 11B, when the brightness of a backlight unit is cut in half only with relation to only a 2-dimensional imaging mode operation realizing a narrow viewing angle, lateral viewing can be greatly prevented and a narrow viewing angle can be realized more precisely.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

As apparent from the above description, a stereoscopic display device using an electrically-driven liquid crystal lens according to the present invention has the effects of facilitating inter-conversion between 2-dimensional images and 3-dimensional images according to the viewer's selection while enabling switching between a wide viewing angle and a narrow viewing angle.

What is claimed is:

1. A stereoscopic display device using an electrically-driven liquid crystal lens comprising:
    a display panel;
    a light source to emit light; and
    the electrically-driven liquid crystal lens provided between the display panel and the light source and containing a reflective electrode to intercept a part of the light emitted from the light source, wherein the electrically-driven liquid crystal lens enables inter-conversion between 3-dimensional images and 2-dimensional images according to whether or not voltages are applied to the electrically-driven liquid crystal lens and wherein the 2-dimensional images are displayed as a wide viewing angle or narrow viewing angle when voltages are applied to the electrically-driven liquid crystal lens.

2. The device according to claim 1, wherein the reflective electrode of the electrically-driven liquid crystal lens functions as a parallax barrier when no voltage is applied to the electrically-driven liquid crystal lens.

3. The device according to claim 1, wherein the electrically-driven liquid crystal lens functions as a diffusing plate when voltages are applied to the electrically-driven liquid crystal lens.

4. The device according to claim 3, wherein the electrically-driven liquid crystal lens functions as a diffusing plate corresponding to a wide viewing angle or narrow viewing angle by adjusting the voltages applied to the electrically-driven liquid crystal lens.

5. The device according to claim 3, wherein the electrically-driven liquid crystal lens includes:
    first and second substrates arranged opposite each other;
    a first electrode formed over the entire surface of the first substrate;
    a plurality of second electrodes formed on the second substrate and defining repeated patterns with a predetermined interval;
    the reflective electrode formed in a different layer from the second electrodes with an insulating film interposed between the reflective electrode and the second electrodes; and
    a liquid crystal layer between the first and second substrates.

6. The device according to claim 5, wherein the reflective electrode is made of an opaque high-reflectivity metal film, and the first and second electrodes are made of transparent metal films.

7. The device according to claim 5, wherein:
    the electrically-driven liquid crystal lens has at least one lens region in a plane, and at least one of the second electrodes corresponds to the lens region; and
    a voltage applied to the second electrodes is higher than a voltage applied to the first electrode.

8. The device according to claim 5, wherein the center of the reflective electrode is consistent with the center of the corresponding second electrode.

9. The device according to claim 8, wherein the light source is a high-condensing light source.

10. The device according to claim 1, wherein the reflective electrode is made of an aluminum film.

11. A stereoscopic display device using an electrically-driven liquid crystal lens comprising:
    a display panel;
    the electrically-driven liquid crystal lens provided on the display panel and converting 2D images and 3D images according to whether or not voltages are applied to the electrically-driven liquid crystal lens, the electrically-driven liquid crystal lens exhibiting an Electrically Controlled Birefringence (ECB) alignment mode; and
    a lens polarizer provided on the electrically-driven liquid crystal lens,
    wherein the 2-dimensional images are displayed as a wide viewing angle or narrow viewing angle when voltages are applied to the electrically-driven liquid crystal lens.

12. The device according to claim 11, wherein the electrically-driven liquid crystal lens functions as a transparent layer when no voltage is applied to the electrically-driven liquid crystal lens.

13. The device according to claim 11, further comprising:
    upper and lower polarizers provided at upper and lower sides of the display panel, respectively.

14. The device according to claim 13, wherein a transmission axis of the lens polarizer is consistent with a transmission axis of the upper polarizer.

15. The device according to claim 11, wherein the electrically-driven liquid crystal lens includes:
    first and second substrates arranged opposite each other;
    a first electrode formed over the entire surface of the first substrate;
    a plurality of second electrodes formed on the second substrate and defining repeated patterns with a predetermined interval; and
    a liquid crystal layer between the first and second substrates.

16. The device according to claim 15, further comprising:
    a first alignment film formed over the entire surface of the first substrate including the first electrode; and
    a second alignment film formed over the entire surface of the second substrate including the plurality of second electrodes,
    wherein the first and second alignment films are aligned in anti-parallel directions.

17. The device according to claim 16, wherein the first and second electrodes are made of transparent metal films.

18. The device according to claim 16, wherein:
    the electrically-driven liquid crystal lens functions as a lens when a voltage, which is higher than a voltage applied to the first electrode, is applied to the second electrodes; and the electrically-driven liquid crystal lens has at least one lens region in a plane, and at least one of the second electrodes corresponds to the lens region.

19. The device according to claim 15, wherein the electrically-driven liquid crystal lens displays 2-dimensional images of a narrow viewing angle when a ground voltage is applied to the plurality of second electrodes and a positive voltage is applied to the first electrode so as to create a uniform electric field in the liquid crystal layer.

* * * * *